C. A. SMITH.
WHEEL FOR VEHICLES.
APPLICATION FILED MAR. 29, 1915

1,175,315.

Patented Mar. 14, 1916.
2 SHEETS—SHEET 1.

C. A. SMITH.
WHEEL FOR VEHICLES.
APPLICATION FILED MAR. 29, 1915.

1,175,315.

Patented Mar. 14, 1916.
2 SHEETS—SHEET 2.

Inventor:—
Charles A. Smith

UNITED STATES PATENT OFFICE.

CHARLES ARTHUR SMITH, OF OLDBURY, NEAR BIRMINGHAM, ENGLAND.

WHEEL FOR VEHICLES.

1,175,315.     Specification of Letters Patent.     Patented Mar. 14, 1916.

Application filed March 29, 1915. Serial No. 17,863.

*To all whom it may concern:*

Be it known that I, CHARLES ARTHUR SMITH, of Edwin Danks and Company (Oldbury) Limited, Oldbury Boiler Works, near Birmingham, in the county of Warwick, England, have invented certain new and useful Improvements in Wheels for Vehicles; and I do hereby declare that the following is a full, clear, and exact description of the same.

This invention relates to wheels for vehicles and is more especially applicable to wheels for heavy vehicles, and the invention has for its object to provide an improved and simplified construction of wheel particularly of the disk type which will in practice be stronger and stiffer than those at present in use.

According to the present invention the wheel comprises one or more members each consisting of a single element having a rim portion, a hub portion, and an intermediate portion of a somewhat conical shape extending from one edge of the rim portion diagonally across to that edge of the hub portion which is disposed on the opposite side of the wheel, the construction being such that a section of one half of the element is of a substantially Z shape, the rim portion and the hub portion forming the horizontal limbs of the Z and the intermediate part forming the diagonal. One of these disks or elements of Z section may be used alone or two such members may be used abutting against each other to form a wheel.

The rim portion or portions may be provided with suitable means for carrying a tire and the hub portion or portions may be provided with an internal sleeve attached thereto and adapted to be fitted upon the axle.

The effect of employing a wheel comprising elements or members of a Z section is that the diagonal intermediate portion will act either as a tie or strut should the rim portion be subject to lateral stress or shock thus reducing the likelihood of deformation of the wheel in such cases.

In manufacturing the wheels according to this invention the members of Z section may be formed by pressing out of blanks or in any other convenient way.

Figure 2:
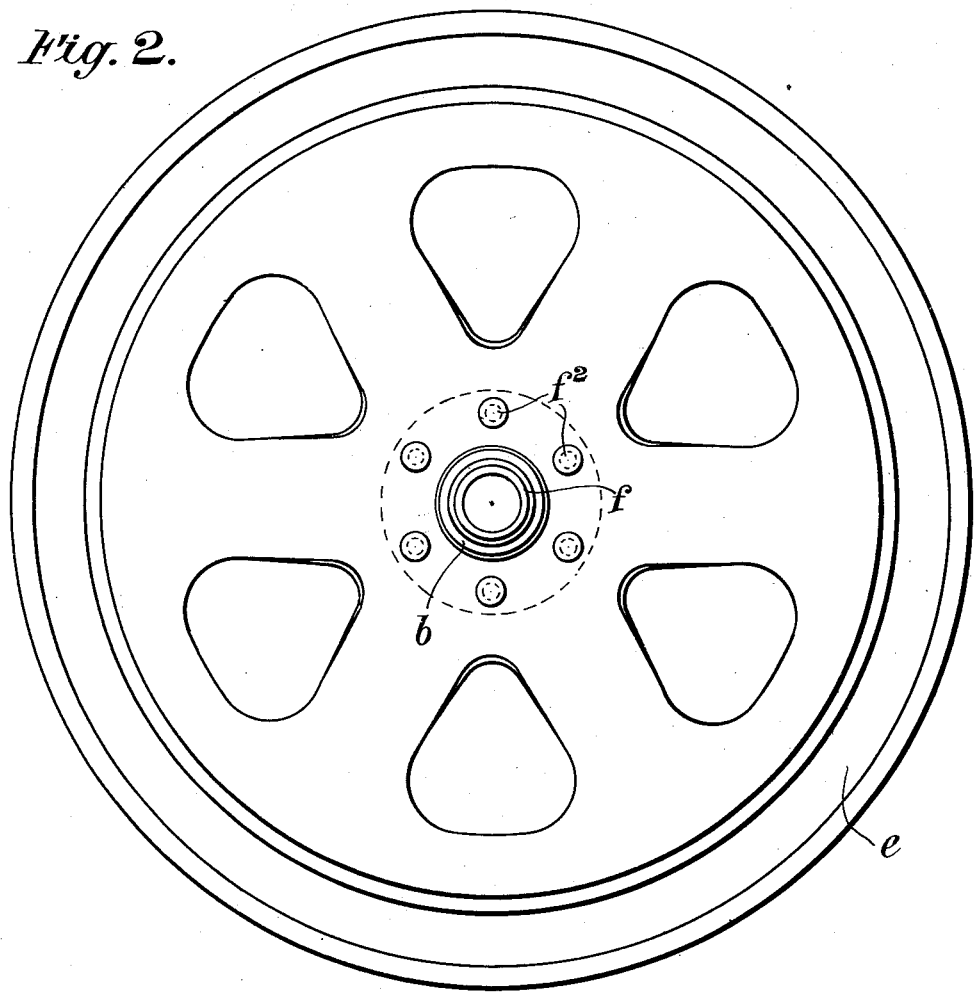
Figure 1:
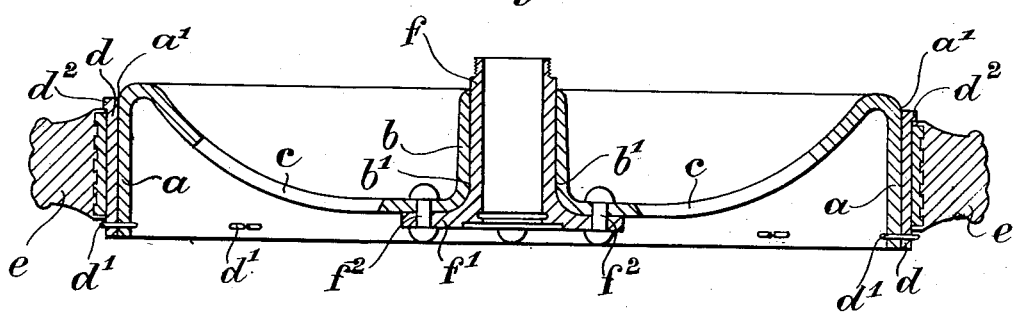
Figure 4:
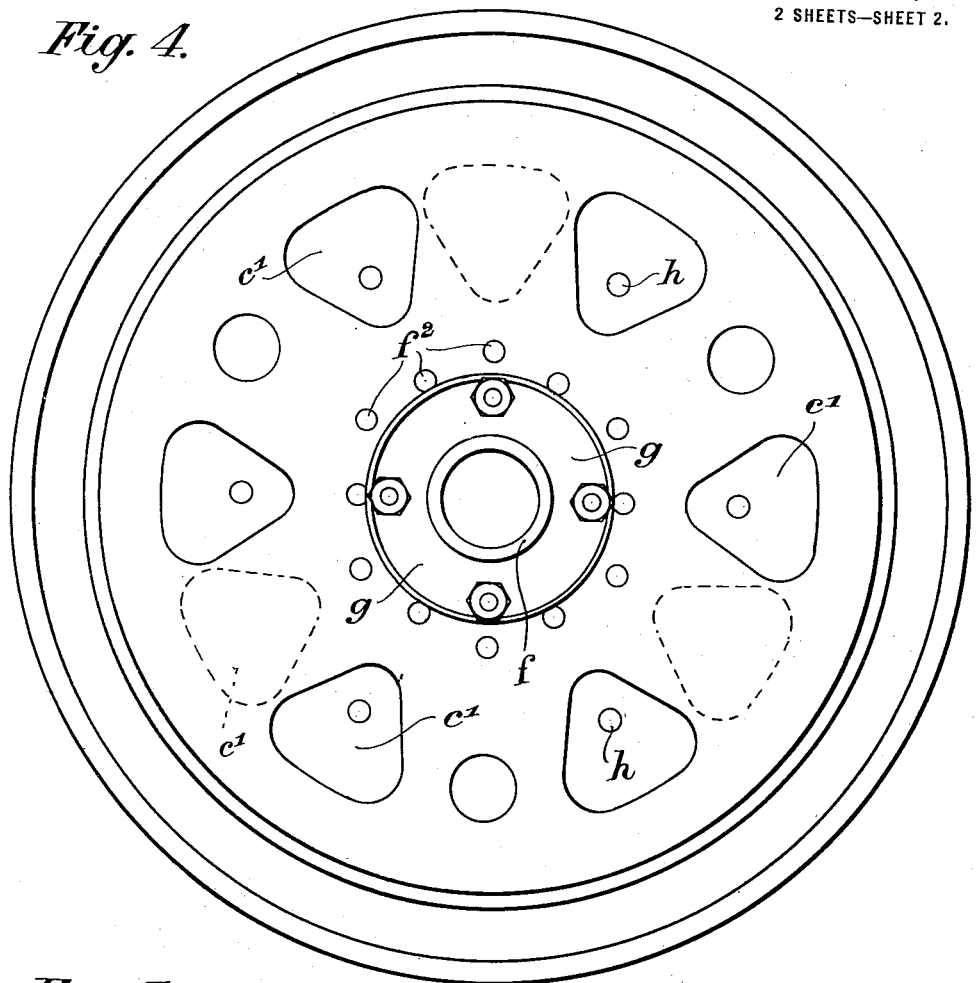
Figure 3:
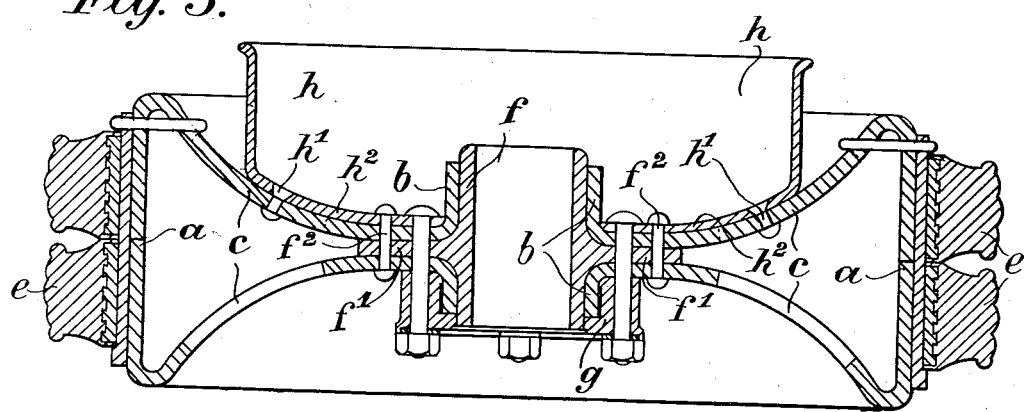

Referring to the drawings, Figure 1 is a diametrical section of a wheel constructed according to my invention. Fig. 2 is a side view. Fig. 3 is a diametrical section of a wheel constructed according to my invention in which two elements of Z section are employed. Fig. 4 is a side view of the construction shown in Fig. 3.

Referring to Figs. 1 and 2 the wheel comprises a single element of substantially Z section having a rim portion $a$, a hub portion $b$, and an intermediate portion $c$ which is somewhat conically shaped and extends from the outer edge $a^1$ of the rim portion diagonally across to the inner edge $b^1$ of the hub portion.

As will be seen from the drawing the intermediate portion may be suitably curved and it may be perforated where required for lightness in some such manner as shown in Fig. 2.

The rim portion $a$ may be provided with an exterior sleeve $d$ which can be attached thereto by welding and this sleeve may be provided with a flange $d^2$ at one edge in order to accommodate and retain a tire such as $e$, staples $d^1$ serving to retain the tire in position as well as to lock the members $d$ and $a$ together.

The hub portion $b$ is provided with a central sleeve $f$ forming a hub which fits upon the axle. The member $f$ is provided with a flange $f^1$ at one end which fits against the inner portion of the intermediate member $c$ and is riveted thereto as shown at $f^2$. In manufacturing the wheel the member $f$ is in the first place in the form of a solid forging or the like and the disk member $a\,b\,c$ is heated, placed in position and shrunk upon the solid hub member $f$, the member $f$ being then riveted to the member $c$ and being bored or otherwise machined as required. In this way it is possible to insure that the bore of the member $f$ is truly central and the outside of the rim may be turned perfectly true as required for the reception of the outer rim or tire.

Referring to Figs. 3 and 4 the construction of the disk members $a\,b$ and $c$ is similar to that already described with reference to Figs. 1 and 2. These two members are however arranged oppositely as shown, so that the two intermediate members $c$ extend respectively from the edges of the rim member toward the center of the sleeve $f$ the flange $f^1$ of which in this case is substantially centrally disposed and extends between the inner portions of the intermediate members $c\,c$. In this construction an additional member *g* is employed fitting around one end of the member *f* and the adjacent member *b* and bolted through the members *c*, *f¹* and *c*. The perforations *c¹* in the two members *c c* are arranged in staggered relation to one another as shown clearly in Fig. 4, and when required the wheel may be provided with a brake drum or the like *h* riveted at *h¹* and at *f²* to the adjacent member *c* the end of this brake drum *h* being provided with an inwardly extending flange *h²* which fits against the adjacent member *c*.

In manufacturing a wheel according to Figs. 3 and 4 the procedure followed is preferably similar to that described with reference to the Figs. 1 and 2.

What I claim then is:—

1. In a vehicle wheel of the type described, the combination of a sleeve, a flange upon said sleeve, a pair of disks of substantially Z shape section disposed on said sleeve, one upon each side of said flange, with their intermediate or diagonal portions converging toward the flange and both secured thereto, a tire mounted upon the exterior perimeter of said disks, and a resilient road tire fixed to said tire.

2. In a vehicle wheel of the type described, the combination of a sleeve, a flange upon said sleeve, a pair of disks of substantially Z shape section disposed on said sleeve, one on each side of said flange, with their intermediate or diagonal portions converging toward the flange, a brake drum, and securing means passing through both of the said disks, the flange and the brake drum and holding them in a definite fixed relationship.

3. In a vehicle wheel of the type described, the combination of a sleeve, a flange upon said sleeve, a disk of substantially Z shape section having a central portion tightly surrounding said sleeve and its intermediate portions curved so as to meet the said central portion substantially at right angles, such part at right angles to said central portion being riveted to said flange, and a metal tire mounted upon the external periphery of said disk.

4. In a vehicle wheel of the type described, the combination of a sleeve, a flange upon said sleeve, and a pair of disks of substantially Z shape section disposed on said sleeve, one upon each side of said flange, with their intermediate or diagonal portions converging toward the flange and curved so as to meet the central portion substantially at right angles, such parts at right angles to said central portion being riveted to said flange and their external peripheral portions abutting together.

In testimony whereof, I have signed my name to this specification in the presence of two subscribing witnesses.

CHARLES ARTHUR SMITH.

Witnesses:
 HAROLD H. FORESTER,
 LEWIS N. HUKER.